United States Patent
Baughman et al.

(10) Patent No.: US 9,552,222 B2
(45) Date of Patent: Jan. 24, 2017

(54) EXPERIENCE-BASED DYNAMIC SEQUENCING OF PROCESS OPTIONS

(71) Applicant: International Business Machines Corporation, Armonk, NY (US)

(72) Inventors: Aaron K. Baughman, Silver Spring, MD (US); Barry M. Graham, Silver Spring, MD (US); James R. Kozloski, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/730,285

(22) Filed: Jun. 4, 2015

(65) Prior Publication Data

US 2016/0357601 A1   Dec. 8, 2016

(51) Int. Cl.
*G06F 9/48* (2006.01)
*G06F 11/34* (2006.01)
*G06F 11/30* (2006.01)
*G06F 9/46* (2006.01)

(52) U.S. Cl.
CPC ............ *G06F 9/4831* (2013.01); *G06F 9/4881* (2013.01); *G06F 9/466* (2013.01); *G06F 11/30* (2013.01); *G06F 11/34* (2013.01)

(58) Field of Classification Search
CPC ...... G06F 9/4831; G06F 9/4881; G06F 9/466; G06F 11/30; G06F 11/34
See application file for complete search history.

(56) References Cited

U.S. PATENT DOCUMENTS

| 5,276,885 | A | 1/1994 | Milnes et al. | |
|---|---|---|---|---|
| 7,197,180 | B2 * | 3/2007 | Farmer | B60R 16/0231 382/160 |
| 7,275,103 | B1 * | 9/2007 | Thrasher | H04L 45/22 709/223 |
| 7,843,822 | B1 | 11/2010 | Paul et al. | |
| 8,144,723 | B2 | 3/2012 | Bar-Ness et al. | |
| 8,375,024 | B2 | 2/2013 | Goeldi | |
| 8,565,552 | B2 | 10/2013 | Sommer et al. | |

(Continued)

OTHER PUBLICATIONS

Farraj et al; Queue Performance Measures for Cognitive Radios in Spectrum Sharing Systems, Workshop on Recent Advances in Cognitive Communicaztions and Networking, 997-1001, 2011.

(Continued)

*Primary Examiner* — Benjamin Wu
(74) *Attorney, Agent, or Firm* — Garg Law Firm, PLLC; Rakesh Garg; Christopher K. McLane

(57) ABSTRACT

For experience-based dynamic sequencing of a set of process options, a first process option is executed at a first stage in a first sequence for a first set of members. The sequence includes several stages of executing a subset of the process options. An experience value is determined corresponding to executing the first process option. The experience value is normalized to calculate a normalized experience value corresponding to the first process option. Using the normalized experience value in a later stage from the plurality of stages, an evaluation is made whether a first trigger threshold is satisfied in a first activation function of a second process choice. When the first trigger threshold of the first activation function being satisfied, the second process choice is included in the first sequence at the later stage.

19 Claims, 8 Drawing Sheets

(56) References Cited

U.S. PATENT DOCUMENTS

| | | | | |
|---|---|---|---|---|
| 8,595,743 | B2* | 11/2013 | Gounares | G06F 9/50 718/104 |
| 9,398,347 | B2* | 7/2016 | Jadallah | H04L 41/5067 |
| 2001/0049597 | A1* | 12/2001 | Klipstein | G06F 17/27 704/200.1 |
| 2003/0142627 | A1* | 7/2003 | Chiu | H04L 45/00 370/238 |
| 2006/0246411 | A1* | 11/2006 | Yang | G09B 7/00 434/323 |
| 2009/0037772 | A1* | 2/2009 | Wegerich | G05B 23/0254 714/26 |
| 2009/0238074 | A1* | 9/2009 | Vasseur | H04L 45/02 370/237 |
| 2011/0305189 | A1 | 12/2011 | Chen et al. | |
| 2013/0103667 | A1 | 4/2013 | Minh | |
| 2013/0297618 | A1 | 11/2013 | Chandrasekaran et al. | |

OTHER PUBLICATIONS

Li et al; Socially Optimal Queuing Control in Cognitive Radio Networks Subject to Service Interruptions: To Queue or Not to Queue?, IEEE Transactions on Wireless Communications, vol. 10, 1656-1666. No. 5, May 2011.

Motwani et al; Caching Queues in Memory Buffers, 2004.

Pinheiro et al; A Multimedia-based Fuzzy Queue-aware Routing Approach for Wireless Mesh Networks, 2011 IEEE.

Wang et al; Distributed Resource Allocation Based on Queue Balancing in Multihop Cognitive Radio Networks, IEEE/ACM Transactions on Networking, vol. 20, No. 3, 837-848, Jun. 2012.

Zhang et al; Performance analysis of the cognitive radio network with a call level queue for secondary users, supported in part by the National High Technology Research and Development Program of China (863 Program) under Grants No. 2007 AA01Z210.

Software Patent Institute Reiser, Martin IBM, A Queueing Network Analysis of Computer Communication Networks With Window Flow Control, Jul. 17, 1978.

Software Patent Institute Melamed, Benjamin University of Michigan College of Literature, Science, and the Arts Computer and Communication Sciences Department Computer Information and Control Engineering Department of Industrial and Operations Engineering, Analysis and Simplifications of Discrete Event Systems and Jackson Queuing Networks, Sep. 30, 1976.

* cited by examiner

EXPERIENCE-BASED DYNAMIC SEQUENCING OF PROCESS OPTIONS

TECHNICAL FIELD

The present invention relates generally to a method, system, and computer program product for improving a consequence of execution ordering of steps in a sequence of operations. More particularly, the present invention relates to a method, system, and computer program product for experience-based dynamic sequencing of process options.

BACKGROUND

Queues are a commonly occurring feature in data processing systems as well as daily life. When there are more things that can be done with available resources, a queue is a commonly used mechanism to sequence the demand.

To begin with a daily life example, people at a theme park routinely form queues to experience a ride or attraction. The capacity of the ride or attraction is often less than the number of people demanding a use of that capacity. Consequently, arriving people take a position in a queue and await their turn to experience the ride or attraction.

Similarly, in a data processing system, a queue is useful for arranging the processes that are awaiting the use of the limited computing resources in the data processing system. Hereinafter, a reference to a "member" can be interpreted as a reference to a person when the scenario or embodiment is applied to a human circumstance, such as in the example of the theme park, and as a reference to a thread, a process, or generally a consumer of a resource in a data processing system when the scenario or embodiment is applied to a data processing system circumstance, such as in the example of the processes using a computing resource (process option) in the data processing system.

Hereinafter, a "sequence" or a "sequence of execution" can similarly be interpreted as a reference to an ordering of human activities or an ordering of computer processes depending on the circumstances of the scenario or embodiment.

Hereinafter, a "process option" can similarly be interpreted as a reference to a human activity, a process available in a data processing system, or a resource in a data processing system, depending on the circumstances of the scenario or embodiment.

A variety of ways exists in which to arrange or order the members for using one or more process options. For example, a first-in-first-out (FIFO) allows waiting members to be queued in the order of their arrival, i.e., in the order in which they presented their demand for the limited resource. A priority-based queuing technique queues members based on their priorities. A higher priority member is queued ahead of a lower priority member, for using the process option before the lower priority member. Many other methods for ordering members for using one or more process options are well known.

In a converse way, the queuing process can also be viewed as a sequencing of process options for a member to use. In other words, a queuing process can also be used to create a sequence in which a member will use a given set of process options.

Often, it is not a single process option that a member uses. Frequently, several members will want to use several process options in some order or sequence. For example, a group of people may want to go on five different rides at the park in some order. As another example, each of one thousand threads may want to use several hardware and software components of a data processing system in some sequence.

SUMMARY

The illustrative embodiments provide a method, system, and computer program product for experience-based dynamic sequencing of process options. An embodiment includes a method for experience-based dynamic sequencing of a set of process options. The embodiment executes, using a processor and a memory, a first process option at a first stage in a first sequence for a first set of members, wherein the sequence comprises a plurality of stages of executing a subset of the set of process options, the subset of process options including the first process option. The embodiment determines, using the processor and the memory, an experience value corresponding to the executing the first process option. The embodiment normalizes the experience value to calculate a normalized experience value corresponding to the first process option. The embodiment evaluates, using the normalized experience value in a later stage from the plurality of stages, whether a first trigger threshold is satisfied in a first activation function of a second process choice. The embodiment includes, responsive to the first trigger threshold of the first activation function being satisfied, the second process choice in the first sequence at the later stage.

Another embodiment includes a computer program product for experience-based dynamic sequencing of a set of process options, the computer program product comprising one or more computer-readable storage devices, and program instructions stored on at least one of the one or more storage devices.

Another embodiment includes a computer system for experience-based dynamic sequencing of a set of process options, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
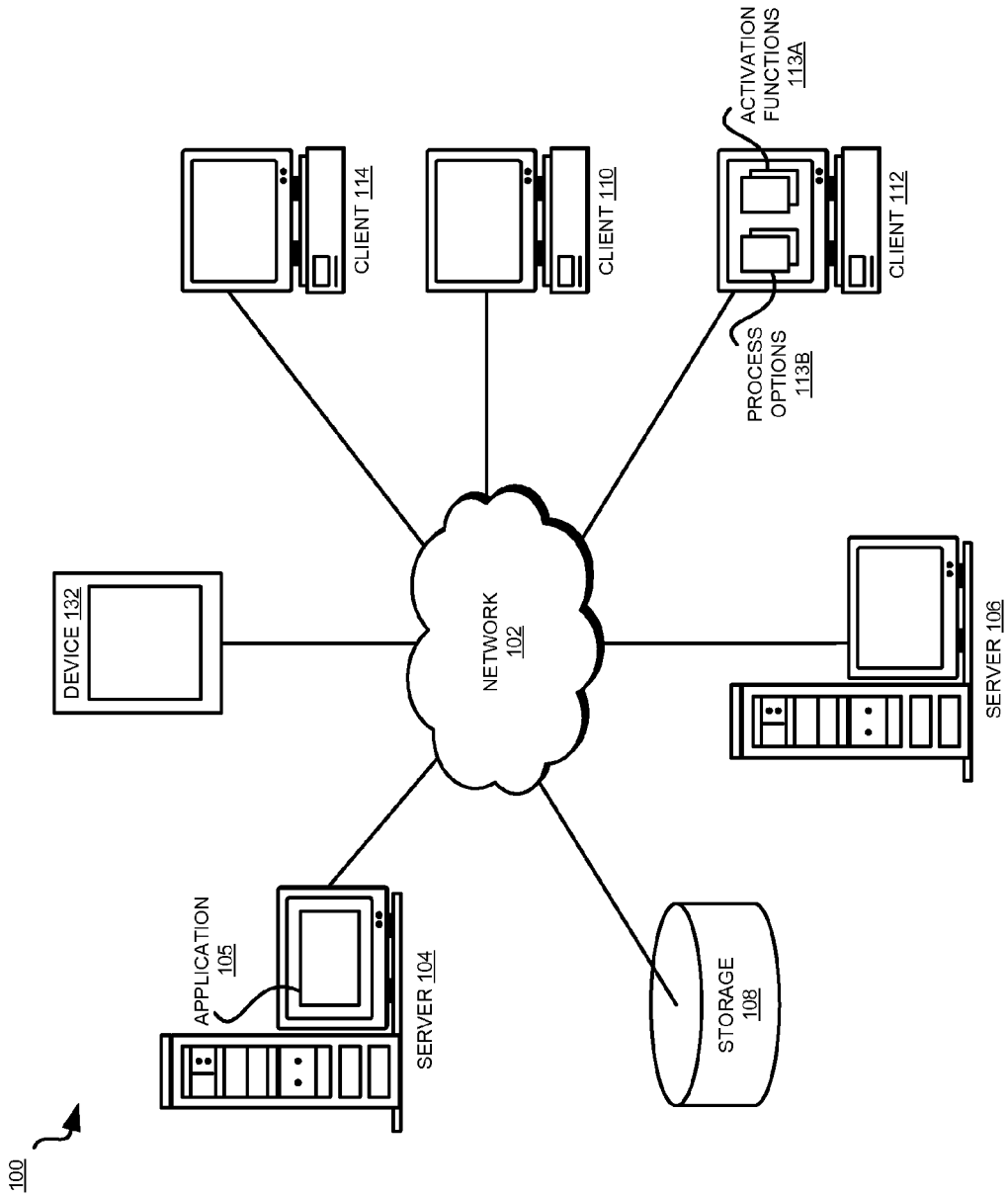
FIG. 1 depicts a block diagram of a network of data processing systems in which illustrative embodiments may be implemented.

The illustrative embodiments recognize that an effectiveness of the ordering of members can be improved if the ordering is done with consideration of the experiences of other members. In other words, if a person or thread is scheduled to use a process option without considering an experience of another person or thread in using that process option, the person or thread might wait in queue after queue and experience a large swing of his or her own experience with the process option.

For example, consider that several people go to a theme park with several rides (process options). The people divide into three groups (members), each group beginning their trip to the park by queuing at a different first ride. The illustrative embodiments recognize the question—where should each group go next? Where should each group go thereafter?

A similar problem can be visualized in a data processing system. Several threads are active and demand the use of several resources in a data processing system. The threads are divided into several groups (members) of one or more threads, each group beginning their execution sequence by queuing for using a different resource (process option) in the data processing system. The illustrative embodiments recognize the question—which resource should each group of threads queue up for next? Which resource should each group use thereafter?

The illustrative embodiments recognize that if the number of members is large, and the number of process options is significant, this ordering problem becomes very complex very quickly. The illustrative embodiments further recognize that the presently available methods for ordering process options into a sequence of operation only consider factors other than an experience of other members in using those process options. For example, the presently available methods use an order of arrival, a priority of the member, and the like, but not whether the use of a process option by other members earlier resulted in any problems, troubles, delays, undesirable effects, etc.

For example, if one group of people had a bad experience on a particular ride, that experience should be considered before another group queues up for that particular ride. It is likely that another group will benefit from omitting the ride entirely or at least queuing up for it at a different time. Similarly, if using a resource with a previous group of threads created a problem in that group of threads or the data processing system, it is likely that another group of threads might have a similar experience when using that resource. Perhaps, the other group of threads should try to use a different resource where the experience of other threads has been better before trying to use the problematic resource.

Within the scope of the illustrative embodiments, when concerning a human member, an experience includes but is not limited to a sentiment, a reaction, a feeling, a mood, an opinion, and the like. Within the scope of the illustrative embodiments, when concerning a process or thread type member, an experience includes but is not limited to an effect on that process or another process, an effect on a data processing system, an effect on the resource, an event of condition created in a data processing system, a cost incurred in a data processing system or data processing environment, a performance achieved in a data processing system, and the like. An experience can be various degrees of good or bad by having a value above or below a threshold on an applicable scale.

Thus, the illustrative embodiments recognize that presently available methods of queuing, arranging, or generally ordering process options in a sequence of execution are prior-experience agnostic. The illustrative embodiments recognize that using prior-experience of other members with the process options as a factor in sequencing a member for using a process option can desirably increase or improve an overall experience of the member from the sequence execution.

The illustrative embodiments used to describe the invention generally address and solve the above-described problems and other problems related to creating a sequence of resources in which a member should use the resources to increase or improve an overall experience of the member in using the sequenced resources. The illustrative embodiments provide a method, system, and computer program product for experience-based dynamic sequencing of process options.

An embodiment measures the experience of each member in a set of members in using a process option. As an example, an experience of a human member can be measured by analyzing a facial expression of a human member, biometric or physiological data of the human, analyzing verbal and non-verbal human speech, analyzing a natural language conversation or feedback of the human, and in other similarly purposed ways. As an example, an experience of a data processing system member can be measured by analyzing information in the data processing system or in a portion thereof concerning a utilization, delay, error, cost, latency, congestion, thermal load, computational load, log entry, and other similarly purposed information available in the data processing system.

A measured experience value of a member's experience in using a process option can be any value on any given scale. The embodiment normalizes the measured experience values corresponding to the set of members to a single normalized value.

The embodiment maps the normalized experience value to a normalized scale. One embodiment configures bands of normalized experience values, each band representing a range of experiences. For example, an embodiment may measure an individual member's experience in using a process option as 259 on a scale of 1-500. The embodiment similarly obtains various values on the scale of 1-500 for the various members of the set that experienced the process option.

A normalized experience value of a set of members for an experience with a process option is mapped to a band in the normalized scale. For example, an embodiment uses a probability distribution function (PDF) to compute a normalized experience value mapping on the given normalized scale. For example, assume that the normalized scale were a scale of 0-100, where a first band of unacceptably bad experience were 0-33.2, a second band of acceptable average experience were 33.3-66.5, and a third band of acceptable good experience were 66.6-100. An embodiment reduces all the measured experience values of a set of members from using a process option to a single normalized experience value in such a band.

A sequence of operation for a set of one or more members begins at a process option that is selected in some manner. The experience of the set of members is measured and mapped in this manner according to an illustrative embodiment.

Thereafter, an embodiment controls the next process option in the sequence using activation functions. Each possible process option that can be executed next by the set of members has a corresponding activation function associated therewith. Each activation function has a threshold trigger value. At or above the threshold trigger value, the activation function fires and allows the execution of the associated process option. Below the threshold trigger value, the activation function prevents the execution of the process option, to wit, subsumes the associated process option.

For an activation function, an embodiment identifies those sets of members who have previously experienced the process option associated with the activation function. The embodiment collects or receives, from such past experiences, zero or more normalized experience values.

One embodiment performs a statistical computation using the collected normalized experience values from other sets of members who are executing, or have executed, other sequences, and one or more previous normalized experience values of the set of members that is executing the present sequence. In one example, the statistical computation is an averaging computation where the embodiment takes a statistical average of the collected normalized experience values of other sets of members and the previous normalized experience values of the present set of members.

The activation function according to an embodiment compares the statistically computed value with the threshold trigger value of the activation function. If the statistically computed value is below the threshold trigger value of the activation function, the activation function subsumes the associated process option, and the set of members is prevented from sequencing the process option next in the sequence of operations. If the statistically computed value is at or above the threshold trigger value of the activation function, the activation function allows the associated process option to be included as the next process option in the sequence for the set of members.

It will be understood by those of ordinary skill in the art, that as the set of members progresses farther into a sequence of operations, more collected normalized experience values of other sets of members become available and more previous normalized experience values of the present set of members also become available. An embodiment continues to perform the statistical operation on all or some of such collected normalized experience values of other sets of members and the previous normalized experience values of the present set of members, to determine whether an activation function for the next process option triggers. Thus, an embodiment dynamically builds and manipulates a sequence of operations by subsuming some process options at some stage of the sequence, and including those process options in the sequence whose activation functions can be triggered based on the experiences of the set of members participating in the sequence as well as of other members who may have previously experienced the process options in question.

An embodiment computes an overall experience value for a sequence executed by a set of members. For example, the embodiment accords different weights to different normalized experience values from different stages in the sequence executed by the set of members. In one embodiment, the normalized experience value from the last or latest executed process option stage in the sequence is given the highest weight, and progressively decreasing weights are given to normalized experience values from the previously executed older stages in the sequence. The embodiment computes the overall experience value using the weighted normalized experience values from various stages of the sequence. This overall experience value is representative of the optimal experience that the given set of members can be expected to have in executing the given set of process options in a sequence.

A method of an embodiment described herein, when implemented to execute on a device or data processing system, comprises substantial advancement of the functionality of that device or data processing system in improving an experience metric of a set of members in executing a sequence of operations. For example, prior-art queuing methods do not account for the past experiences of the set of members with other process options, the past experiences of other sets of members with other process options, or both. An embodiment adjusts sequence of process options dynamically based on the past experiences of the set of members with previously executed process options in the sequence, the past experiences of other sets of members with other process options in other sequences, or both. An embodiment further computes and provides the optimal level of experience the given set of members can be expected to achieve from a sequence of operations. Such computed overall experience values can be useful in modeling sequence of operations that are likely to improve the experience or increase the satisfaction of the requirements of future sets of members in future executions. Such manner of experience-based sequence construction and experience optimization is unavailable in presently available devices or data processing systems. Thus, a substantial advancement of such devices or data processing systems by executing a method of an embodiment improves the experience of members in executing a set of process options.

The illustrative embodiments are described with respect to certain members, process options, sequences, experiences, experience measurements, ranges, value computations, normalization, statistical computations, weighting, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
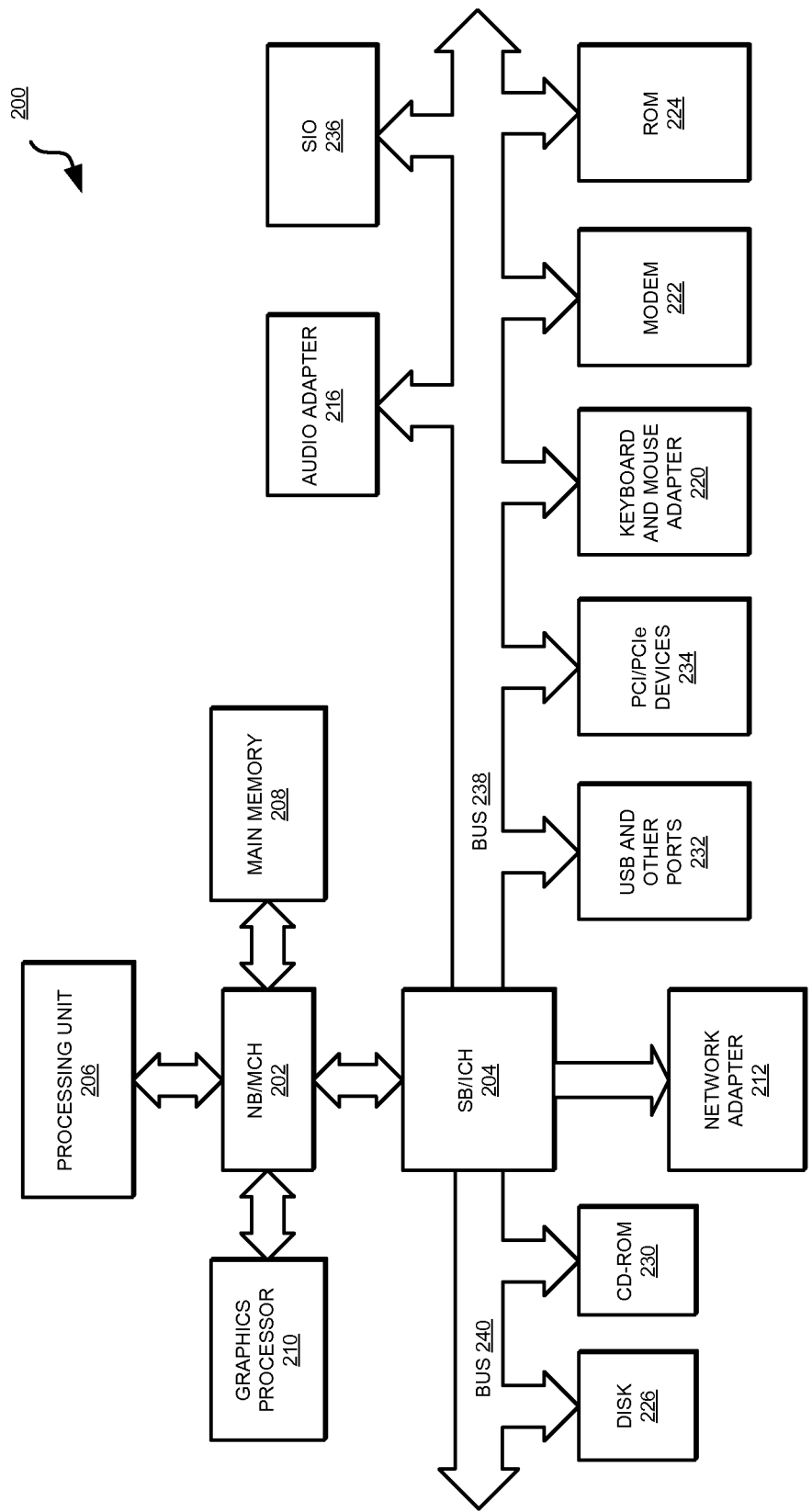
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

An embodiment described herein can be implemented in any data processing system, such as in the form of application 105 in server 104. Application 105 operates in conjunction with activation functions 113A and process options 113B as described herein. Application 105, activation functions 113A, and process options 113B can be on the same different systems within the scope of the illustrative embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
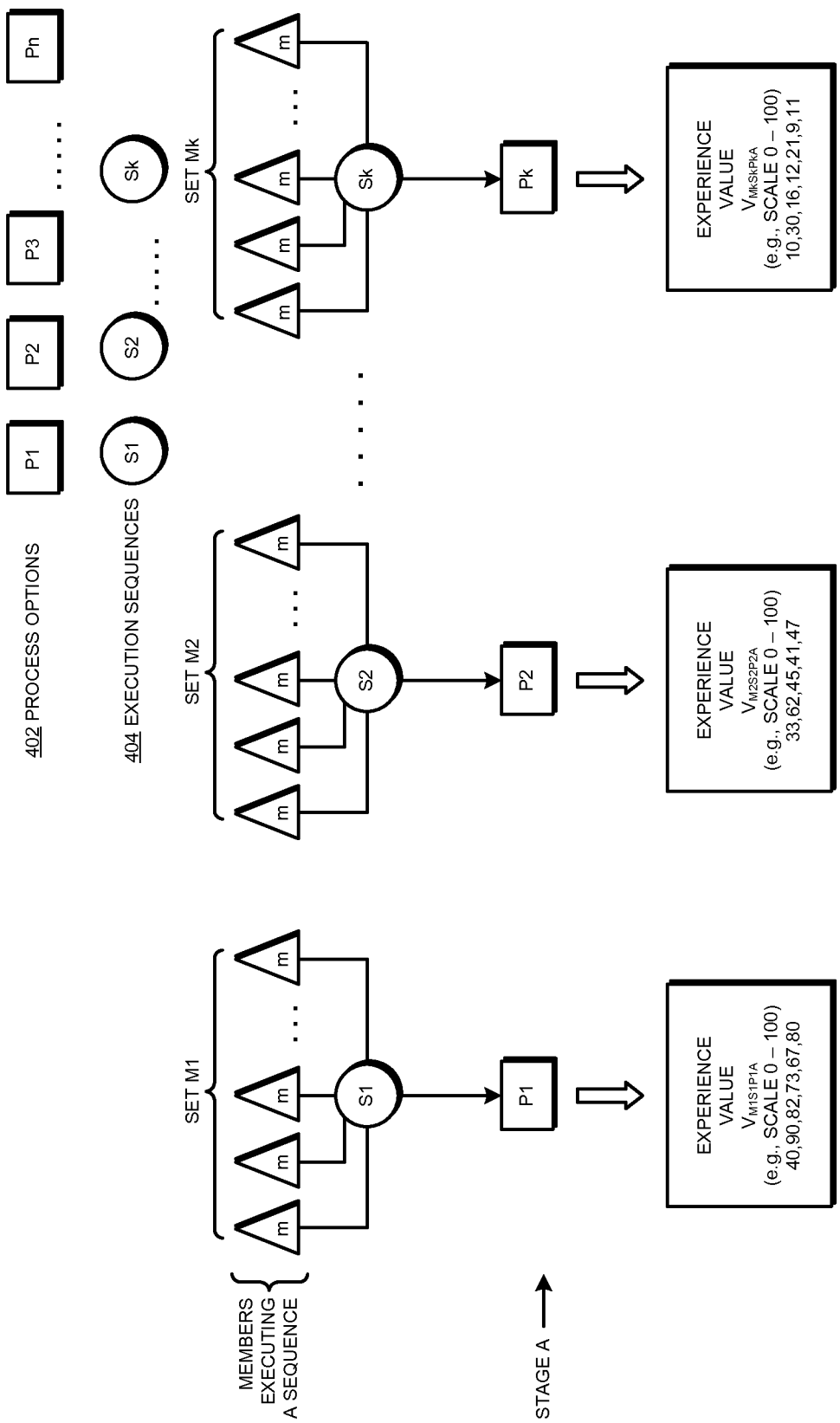
FIG. 3 depicts a block diagram of a configuration for experience-based dynamic sequencing of process options in accordance with an illustrative embodiment.

With reference to FIG. 3, this figure depicts a block diagram of a configuration for experience-based dynamic sequencing of process options in accordance with an illustrative embodiment. Application 105 in FIG. 1 configures process options 402 into sequences of operations 404.

For example, assume that n process options P1, P2, P3 . . . Pn are included in process options 402 that are to be configured into k sequences S1, S2 . . . Sk. Set of members M1 is to execute sequence S1, set of members M2 is to execute sequence S2, and so on up to set of members Mk, which is to execute sequence Sk in a experience-based dynamic sequencing of process options.

Set of members M1 begins sequence S1 using process option P1 and produce an experience value corresponding to each member of set M1. Such individual experience values are referenced as experience values Vm1s1p1A (experience value of set M1 in sequence S1 with process option P1 at stage A of the sequence). For example, if the experiences of the members were measured or calibrated to a raw experience scale of 0-100, the members of set M1 would produce, for example, experience values 40, 90, 82, 73, 67, and 80, indicating varying levels of generally good individual experiences of the individual members while executing process option P1 in sequence S1 at stage A.

Set of members M2 begins sequence S2 using process option P2 and produce an experience value corresponding to each member of set M2. Such individual experience values are referenced as experience values Vm2s2p2A (experience value of set M2 in sequence S2 with process option P2 at stage A of the sequence). Again, for example, if the experiences of the members were measured or calibrated to a raw experience scale of 0-100, the members of set M2 would produce, for example, experience values 33, 62, 45, 41, and 47, indicating varying levels of generally average individual experiences of the individual members while executing process option P2 in sequence S2 at stage A.

Proceeding in a similar manner, set of members Mk begins sequence Sk using process option Pk and produce an experience value corresponding to each member of set Mk. Such individual experience values are referenced as experience values VmkskpkA (experience value of set Mk in sequence Sk with process option Pk at stage A of the sequence). Again, for example, if the experiences of the members were measured or calibrated to a raw experience scale of 0-100, the members of set Mk would produce, for example, experience values 10, 30, 16, 12, 21, 9, and 11, indicating varying levels of generally bad individual experiences of the individual members while executing process option Pk in sequence Sk at stage A.

Figure 4:
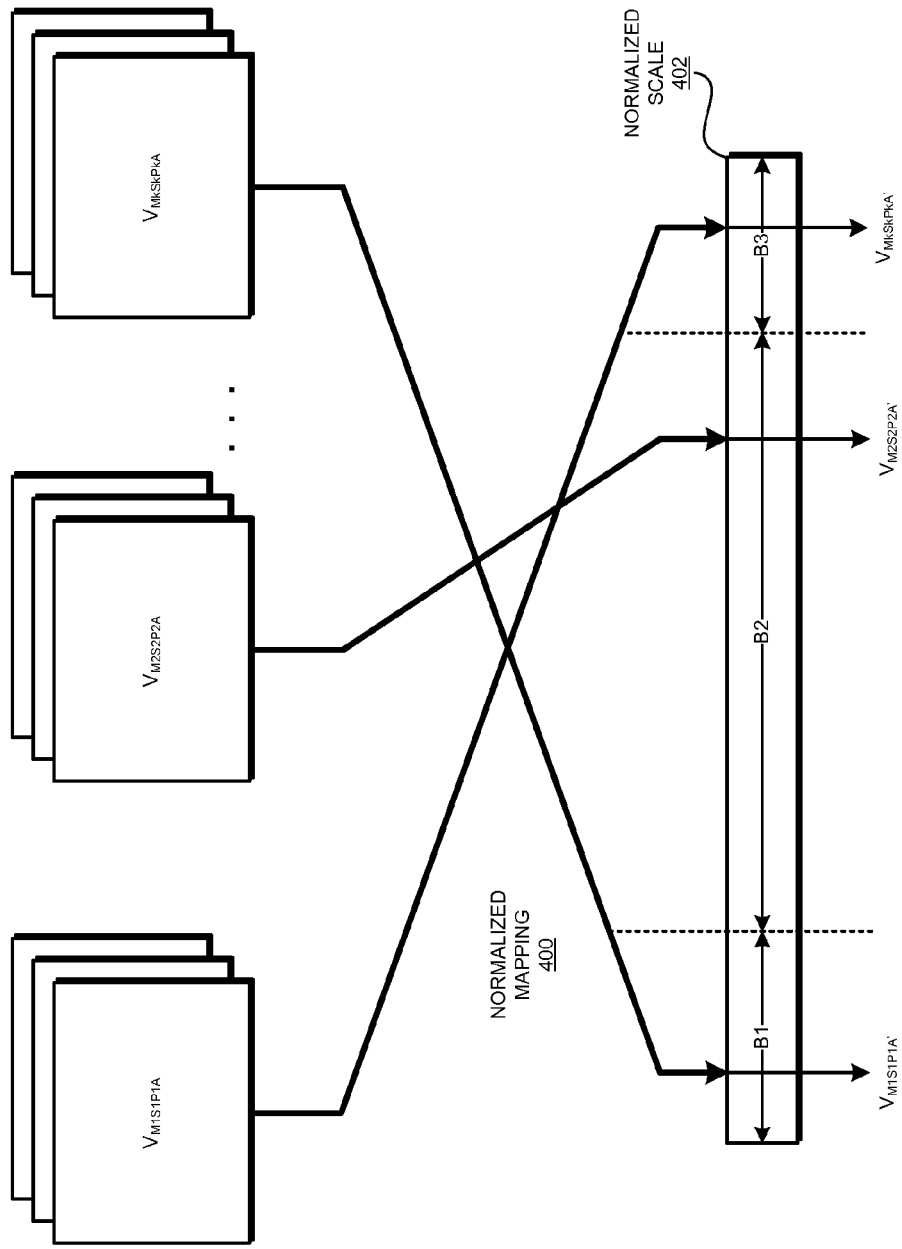
FIG. 4 depicts a block diagram of normalizing individual experience values in accordance with an illustrative embodiment.

With reference to FIG. 4, this figure depicts a block diagram of normalizing individual experience values in accordance with an illustrative embodiment. Experience values Vm1s1p1A, Vm2s2p2A, . . . and VmkskpkA are the same as measured by application 105 from the sequences shown in FIG. 3.

Application 105 performs normalized mapping 400 of each set of individual experience values, such as the set of Vm1s1p1A corresponding to the members of set M1, the set of Vm2s2p2A corresponding to the members of set and the set of VmkskpkA corresponding to the members of set Mk, bands of normalized experience values in normalized scale 402. Bands B1, B2, and B3 are three example bands spanning different portions of normalized scale 402. Any number of bands can be defined with upper and lower bounds in normalized scale 402 in a similar manner.

For example, suppose that a band has a lower threshold (NewMin) and an upper threshold (NewMax). Further suppose that the raw scale over which an experience value was measured is bound by a lower threshold (OldMin) and an upper threshold (OldMax). Suppose that a member's raw experience value was an average experience of value x. According to one embodiment, application 105 computes the normalized experience value (y) as follows—

$$y = ((\text{raw experience value} - \text{OldMin}) * (\text{NewMax} - \text{NewMin}))/(\text{OldMax} - \text{OldMin})) + \text{NewMin}$$

As an example, suppose that band B2 on an example normalized scale 402 is between 33.3 and 66.5, and represents normalized average experience. Suppose that a member's raw experience value was an average experience of value x on a raw scale of 0-100.

Accordingly, for this example, $$y = ((x - 0) * (66.5 - 33.3)/(100 - 0)) + 33.3$$

Application 105 averages each such normalized value over a set of members to obtain a normalized experience value for the set of members. The normalized experience value corresponding to experience values Vm1s1p1A for all members of set M1 is denoted as Vm1s1p1A', which in this non-limiting example is shown to fall in band B3 representing a good experience. Similarly, the normalized experience value corresponding to experience values Vm2s2p2A for all members of set M2 is denoted as Vm2s2p2A', which in this non-limiting example is shown to fall in band B2 representing an average experience. Similarly, the normalized experience value corresponding to experience values VmkskpkA for all members of set Mk is denoted as VmkskpkA', which in this non-limiting example is shown to fall in band B1 representing a bad experience.

Figure 5:
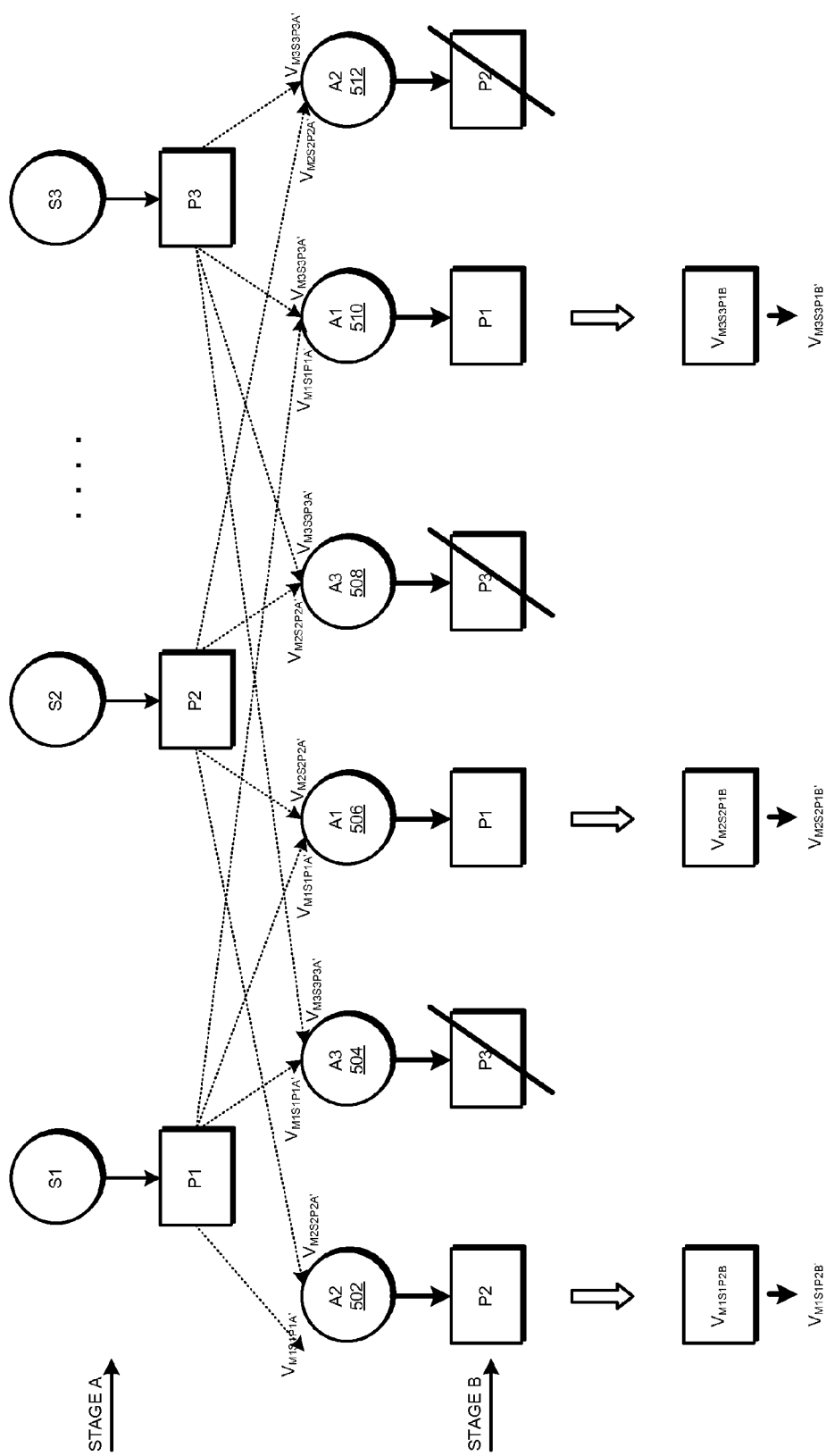
FIG. 5 depicts a dynamically sequenced stage in a sequence of execution in accordance with an illustrative embodiment.

With reference to FIG. 5, this figure depicts a dynamically sequenced stage in a sequence of execution in accordance with an illustrative embodiment. In this figure, entities carrying similar reference designations as in a previously described figure represent the same entities as described with respect to those previously described figures. K sequences, k sets of members, and k process options are limited to 3 in this figure for the clarity of the description purposes only. Entities with sub-labels 1 and 2 remain the same as in the previous figures, but entities with sub-label k in the previous figures are now represented with sub-label 3 accordingly.

At stage B in sequence S1, the set of members M1 has already executed process option P1. Thus, for set of members M1, at stage B, the choices remaining to be sequenced are process options P2 and P3. Activation function A2 (502) is associated with process option P2 and decides whether P2 is subsumed or executed in sequence S1. Activation function A3 (504) is associated with process option P3 and decides whether P3 is subsumed or executed in sequence S1.

Similarly, for set of members M2, at stage B, the choices remaining to be sequenced are process options P1 and P3. Activation function A1 (506) is associated with process option P1 and decides whether P1 is subsumed or executed in sequence S2. Activation function A3 (508) is associated with process option P3 and decides whether P3 is subsumed or executed in sequence S2.

Similarly, for set of members M3, at stage B, the choices remaining to be sequenced are process options P1 and P2. Activation function A1 (510) is associated with process option P1 and decides whether P1 is subsumed or executed in sequence S3. Activation function A2 (512) is associated with process option P2 and decides whether P2 is subsumed or executed in sequence S3.

Activation function A2 (502) collects or receives one or more normalized experience values in executing P2 in other sequences by other sets of members. For example, A2 (502) receives Vm2s2p2A' as shown from the execution of P2 in S2 by M2 at stage A. Activation function A2 (502) also receives one or more previous normalized experience values the same sequence by the same set of members. For example, A2 (502) receives Vm1s1p1A' as shown from the execution of P1 in S1 by M1 at stage A.

Using these collected normalized experience values and previous normalized experience values, A2 (502) determines whether these values are sufficient to trigger A2. In one embodiment, as a part of its determining, A2 computes an average of these collected normalized experience values and previous normalized experience values, and compares the computed average with A2's (502) trigger threshold. In the depicted example, A2 triggers the inclusion of P2 in stage B of sequence S1 for M1.

Activation function A3 (504) similarly collects or receives one or more normalized experience values in executing P3 in other sequences by other sets of members. For example, A3 (504) receives Vm3s3p3A' as shown from the execution of P3 in S3 by M3 at stage A. Activation function A3 (504) also receives one or more previous normalized experience values the same sequence by the same set of members. For example, A3 (504) receives Vm1s1p1A' as shown from the execution of P1 in S1 by M1 at stage A.

Using these collected normalized experience values and previous normalized experience values, A3 (504) determines whether these values are sufficient to trigger A3. In one embodiment, as a part of its determining, A3 computes an average of these collected normalized experience values and previous normalized experience values, and compares the computed average with A3's (504) trigger threshold. In the depicted example, A3 does not trigger the execution of P3 in stage B of sequence S1 for M1. In other words, P3 is subsumed at stage B in sequence S1 for M1.

When M1 executes P2 in S1 as a result of A2 (502) triggering P2's inclusion in S1, application 105 measures and produces raw experience values Vm1s1p2B for each member of M1. Application 105 normalizes the set of Vm1s1p2B values to Vm1s1p2B' as described with respect to FIG. 4.

Activation function A1 (506) similarly operates to include process option P1 in sequence S2. Activation function A3 (508) similarly operates to subsume process option P3 in sequence S2. Accordingly, application 105 produces a set of Vm2s2p1B values and a Vm2s2p1B' value in a similar manner.

Activation function A1 (510) similarly operates to include process option P1 in sequence S3. Activation function A2 (512) similarly operates to subsume process option P2 in sequence S3. Accordingly, application 105 produces a set of Vm3s3p1B values and a Vm3s3p1B' value in a similar manner.

Note that one process option is shown to be included and one process option is shown to be subsumed in a sequence in this figure only as a non-limiting example, only for the clarity of the description. Multiple process options can be included or subsumed in a sequence in this manner within the scope of the illustrative embodiments.

Figure 6:
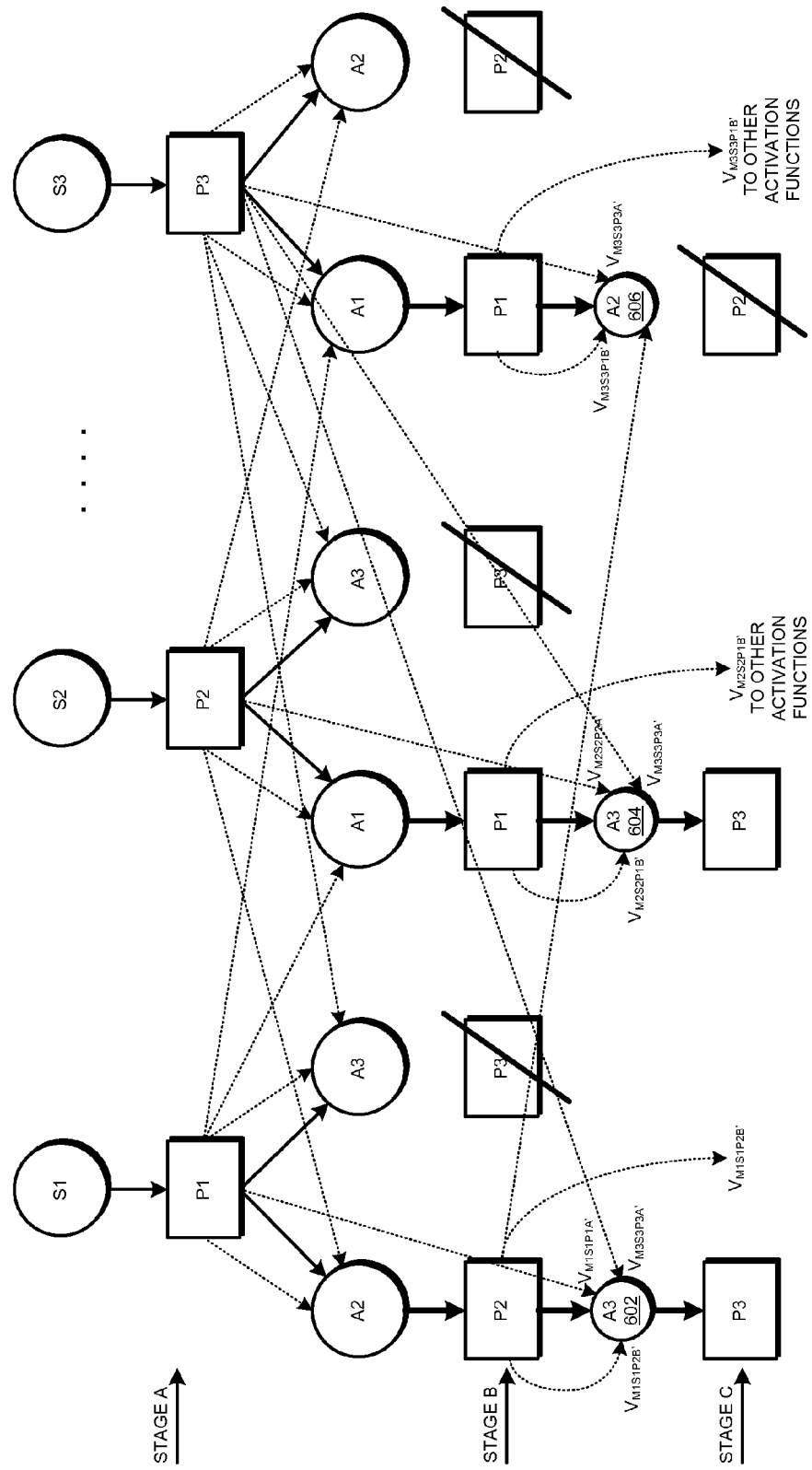
FIG. 6 depicts another dynamically sequenced stage in a sequence of execution in accordance with an illustrative embodiment.

With reference to FIG. 6, this figure depicts another dynamically sequenced stage in a sequence of execution in accordance with an illustrative embodiment. In this figure, entities carrying similar reference designations as in a previously described figure represent the same entities as described with respect to those previously described figures. Sequences S1, S2, and S3 are the same as sequences S1, S2, and S3, respectively, as depicted in FIG. 5, up to stage B. Sequences S1, S2, and S3 are configured with new stage C in FIG. 6 in accordance with an embodiment.

Activation function A3 (602) similarly collects or receives one or more normalized experience values in executing P3 in other sequences by other sets of members. For example, A3 (602) receives Vm3s3p3A' as shown from the execution of P3 in S3 by M3 at stage A. Activation function A3 (602) also receives one or more previous normalized experience values the same sequence by the same set of members. For example, A3 (602) receives Vm1s1p1A' as shown from the execution of P1 in S1 by M1 at stage A and Vm1s1p2B' from the execution of P2 in S1 by M1 at stage B. Activation function A3 (602) operates to include process option P3 in sequence S1 as described with other activation functions in FIG. 5.

Activation function A3 (604) similarly receives various collected and previous normalized experience values, and operates to include process option P3 in sequence S2. Activation function A2 (606) similarly receives various collected and previous normalized experience values, operates to subsume process option P2 in sequence S3.

As can be seen, any number of stages with any number of process options can similarly be configured using an embodiment. Any number of sets of members can participate in any number of sequences in a similar manner using an embodiment.

Figure 7:
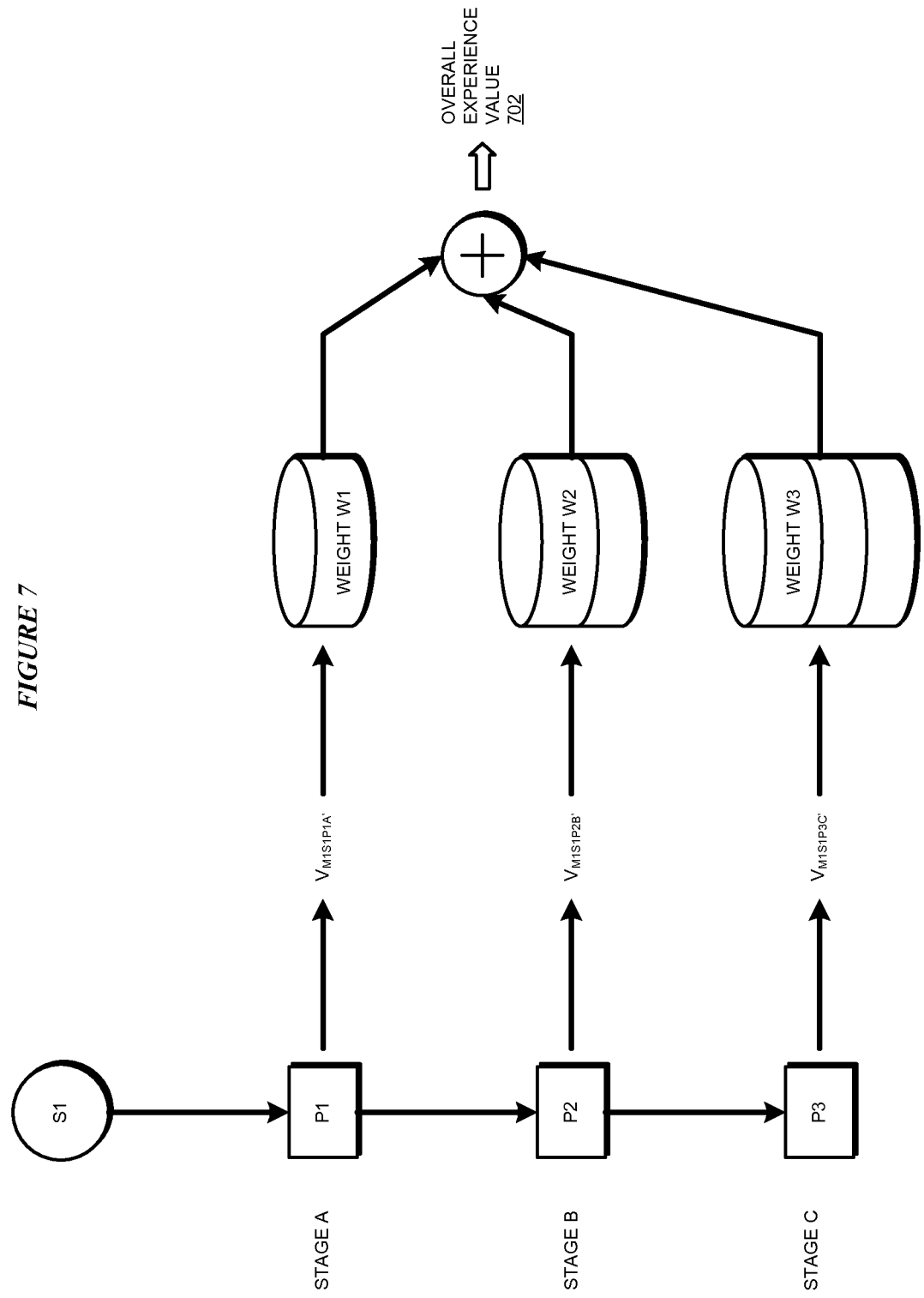
FIG. 7 depicts a block diagram of an example process of computing an overall experience value in executing a sequence in accordance with an illustrative embodiment.

With reference to FIG. 7, this figure depicts a block diagram of an example process of computing an overall experience value in executing a sequence in accordance with an illustrative embodiment. Example sequence S1 is the same as sequence S1 depicted in FIG. 6.

Application 105 computes an overall experience value. For example, in one embodiment, for an experience-based dynamically sequenced process options execution by a set of members, the embodiment assigns progressively decreasing weights as shown, to the combined normalized experience value computed at the various stages of the sequence. For example, the embodiment assigns weight W3 to the experience of the latest stage, stage C, i.e., to Vm1s1p3C'. The embodiment assigns a smaller weight W2 to the experience of the previous stage, stage B, i.e., to Vm1s1p2B'. In a progressively decreasing manner in a similar way, the embodiment assigns the smallest weight W1 to the experience of the earliest stage, stage A, i.e., to Vm1s1p1A'.

One embodiment multiplies the assigned weight with the corresponding combined normalized experience value, and adds the results. The resulting total is overall experience value 702 for an experience-based dynamically sequenced process options execution by a set of members. In the depicted example overall experience value 702 is for members in M1 executing the process options as dynamically arranged in sequence S1. In the future, with a similar composition of a set of members as M1, sequence S1 can be reconstructed to yield an optimum experience for the new set of members in executing a similar set of process options.

Figure 8:
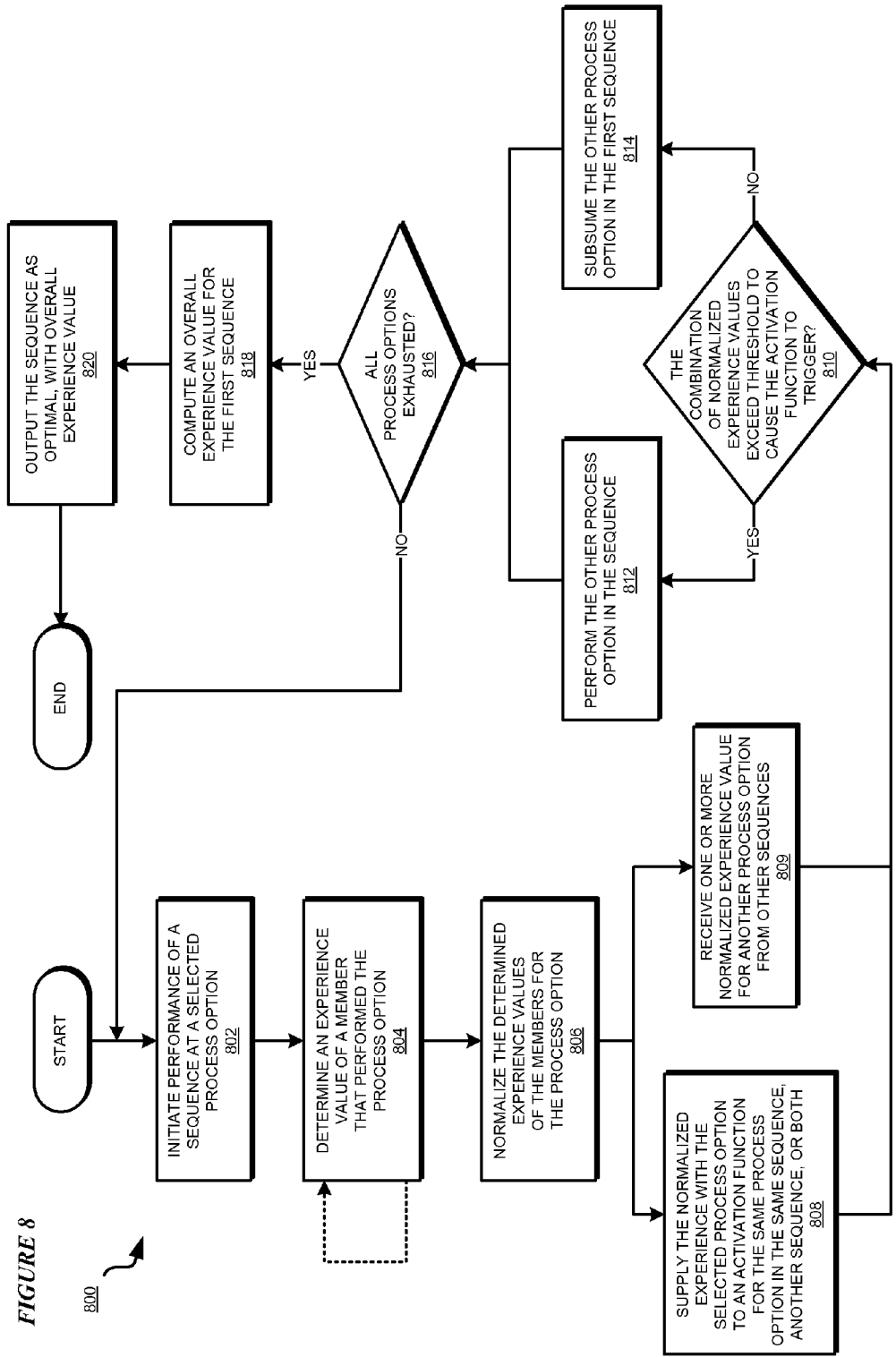
FIG. 8 depicts a flowchart of an example process for experience-based dynamic sequencing of process options in accordance with an illustrative embodiment.

With reference to FIG. 8, this figure depicts a flowchart of an example process for experience-based dynamic sequencing of process options in accordance with an illustrative embodiment. Process 800 can be implemented in application 105 in FIG. 1.

The application initiates a performance of a sequence at a selected process option, such as by initiating stage A of S1 at P1 as described in an example in this disclosure (block 802). The application determines an experience value for a member that performed the process option (block 804). For example, the application determines Vm1s1p1A for a member of M1 as described in an example in this disclosure. The application repeats block 804 for any number of members for whom/which the experience value is to be determined.

The application normalizes the determined experience values for the members for the selected process option (block 806). The application supplies the normalized experience value, such as Vm1s1p1A', to an activation function of the same process option in the same sequence, another sequence, or both (block 808). For example, a process option may repeat in a given sequence under certain circumstances.

The application also receives or collects one or more normalized experience values for another process option from other sequences (block 809). For example, a new stage in S1 may receive Vm2s2p2A' at A2 for including or subsuming P2, as described in an example in this disclosure.

The application determines whether the normalized experience values collected from other sequences, previous normalized experience values in the same sequence, or a computation based on a combination thereof, meets or exceeds the trigger threshold of an activation function at the next stage in the sequence (block 810). If the trigger threshold of the activation function is met or exceeded ("Yes" path of block 810), the application causes the activation function to trigger an inclusion of the corresponding process option into the sequence at that stage (block 812). If the trigger threshold of the activation function is not met or exceeded ("No" path of block 810), the application causes the activation function to trigger a subsumption of the corresponding process option from the sequence at that stage (block 814).

The application determines whether all process options that were desired to be arranged or staged in a sequence have been exhausted (block 816). If some process options remain ("No" path of block 816), the application returns process 800 to block 802 to select another process option, but based on an activation function triggering an inclusion or subsumption.

If all process options are exhausted ("Yes" path of block 816), the application computes an overall experience value for the sequence (block 818). The application outputs the sequence as an optimal arrangement of process options, having the computed overall experience value of block 818 (block 820). The application ends process 800 thereafter.

Thus, a computer implemented method, system or apparatus, and computer program product are provided in the illustrative embodiments for experience-based dynamic sequencing of process options. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for experience-based dynamic sequencing of a set of process options, the method comprising:
   executing, using a processor and a memory, a first process option at a first stage in a first sequence for a first set of members, wherein the sequence comprises a plurality of stages of executing a subset of the set of process options, the subset of process options including the first process option;
   determining, using the processor and the memory, an experience value corresponding to the executing the first process option;
   normalizing the experience value to calculate a normalized experience value corresponding to the first process option;
   mapping, as a part of the normalizing, the experience value to a band in a normalized experience scale, wherein the band is bound by an upper normalized experience threshold and a lower normalized experience threshold;
   evaluating, using the normalized experience value in a later stage from the plurality of stages, whether a first trigger threshold is satisfied in a first activation function of a second process choice; and
   including, responsive to the first trigger threshold of the first activation function being satisfied, the second process choice in the first sequence at the later stage.

2. The method of claim 1, further comprising:
   evaluating, using the normalized experience value in the later stage, whether a second trigger threshold is satisfied in a second activation function of a third process choice; and
   excluding, responsive to the second trigger threshold of the second activation function not being satisfied, the third process choice from the first sequence at the later stage.

3. The method of claim 1, further comprising:
   supplying the normalized experience value to a second activation function of a third process choice in a second sequence;
   evaluating, using the normalized experience value in a stage in the second sequence and using a second normalized experience value from a previous stage in the second sequence, whether a second trigger threshold is satisfied in the second activation function of the third process choice; and
   excluding, responsive to the second trigger threshold of the second activation function not being satisfied, the third process choice from the first sequence at the stage in the second sequence.

4. The method of claim 1, further comprising:
   evaluating, as a part of determining the experience value, for each member in the first set of members, a corresponding experience value for executing the first process option.

5. The method of claim 1, wherein the process option is a resource in a data processing system, wherein the executing comprises allowing a thread to use the resource, the thread being a member in the first set of members.

6. The method of claim 1, further comprising:
   computing using a plurality of normalized experience values from the plurality of stages, an overall experience value corresponding to the first sequence;
   saving the overall experience value as an optimum experience value achieved by executing the first sequence; and
   configuring the first sequence for execution by a second set of members such that the second set of members achieve the overall experience value when executing the first sequence.

7. The method of claim 1, wherein the experience value comprises an error caused by executing the first process option.

8. The method of claim 1, wherein the experience value comprises a utilization of a computing resource incurred by executing the first process option.

9. The method of claim 1, wherein the experience value comprises a delay caused by executing the first process option.

10. The method of claim 1, wherein the experience value comprises a biometric value of a human member captured upon executing the first process option, wherein the human member is a member of the set of members.

11. The method of claim 1, wherein the experience value comprises a value computed from a non-verbal communication of a human member upon executing the first process option, wherein the human member is a member of the set of members.

12. The method of claim 1, wherein the experience value comprises a value computed from a natural language communication of a human member upon executing the first process option, wherein the human member is a member of the set of members.

13. The method of claim 1, wherein the method is embodied in a computer program product comprising one or more computer-readable storage devices and computer-readable program instructions which are stored on the one or more computer-readable tangible storage devices and executed by one or more processors.

14. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

15. A computer program product for experience-based dynamic sequencing of a set of process options, the computer program product comprising one or more computer-readable storage medium, and program instructions stored on at least one of the one or more storage medium, the stored program instructions comprising:

program instructions to execute, using a processor and a memory, a first process option at a first stage in a first sequence for a first set of members, wherein the sequence comprises a plurality of stages of executing a subset of the set of process options, the subset of process options including the first process option;

program instructions to determine, using the processor and the memory, an experience value corresponding to the executing the first process option;

program instructions to normalize the experience value to calculate a normalized experience value corresponding to the first process option;

program instructions to map, as a part of the program instructions to normalize, the experience value to a band in a normalized experience scale, wherein the band is bound by an upper normalized experience threshold and a lower normalized experience threshold;

program instructions to evaluate, using the normalized experience value in a later stage from the plurality of stages, whether a first trigger threshold is satisfied in a first activation function of a second process choice; and program instructions to include, responsive to the first trigger threshold of the first activation function being satisfied, the second process choice in the first sequence at the later stage.

16. The computer program product of claim 15, further comprising:

program instructions to evaluate, using the normalized experience value in the later stage, whether a second trigger threshold is satisfied in a second activation function of a third process choice; and program instructions to exclude, responsive to the second trigger threshold of the second activation function not being satisfied, the third process choice from the first sequence at the later stage.

17. The computer program product of claim 15, further comprising:

program instructions to supply the normalized experience value to a second activation function of a third process choice in a second sequence;

program instructions to evaluate, using the normalized experience value in a stage in the second sequence and using a second normalized experience value from a previous stage in the second sequence, whether a second trigger threshold is satisfied in the second activation function of the third process choice; and program instructions to exclude, responsive to the second trigger threshold of the second activation function not being satisfied, the third process choice from the first sequence at the stage in the second sequence.

18. The computer program product of claim 15, further comprising:

program instructions to evaluate, as a part of determining the experience value, for each member in the first set of members, a corresponding experience value for executing the first process option.

19. A computer system for experience-based dynamic sequencing of a set of process options, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to execute, using a processor and a memory, a first process option at a first stage in a first sequence for a first set of members, wherein the sequence comprises a plurality of stages of executing a subset of the set of process options, the subset of process options including the first process option;

program instructions to determine, using the processor and the memory, an experience value corresponding to the executing the first process option;

program instructions to normalize the experience value to calculate a normalized experience value corresponding to the first process option;

program instructions to map, as a part of the program instructions to normalize, the experience value to a band in a normalized experience scale, wherein the band is bound by an upper normalized experience threshold and a lower normalized experience threshold;

program instructions to evaluate, using the normalized experience value in a later stage from the plurality of stages, whether a first trigger threshold is satisfied in a first activation function of a second process choice; and program instructions to include, responsive to the first trigger threshold of the first activation function being satisfied, the second process choice in the first sequence at the later stage.

* * * * *